Nov. 4, 1941.  R. D. BUELL  2,261,222
ELECTRIC MOVABLE BEAM LAMP
Filed Jan. 18, 1939
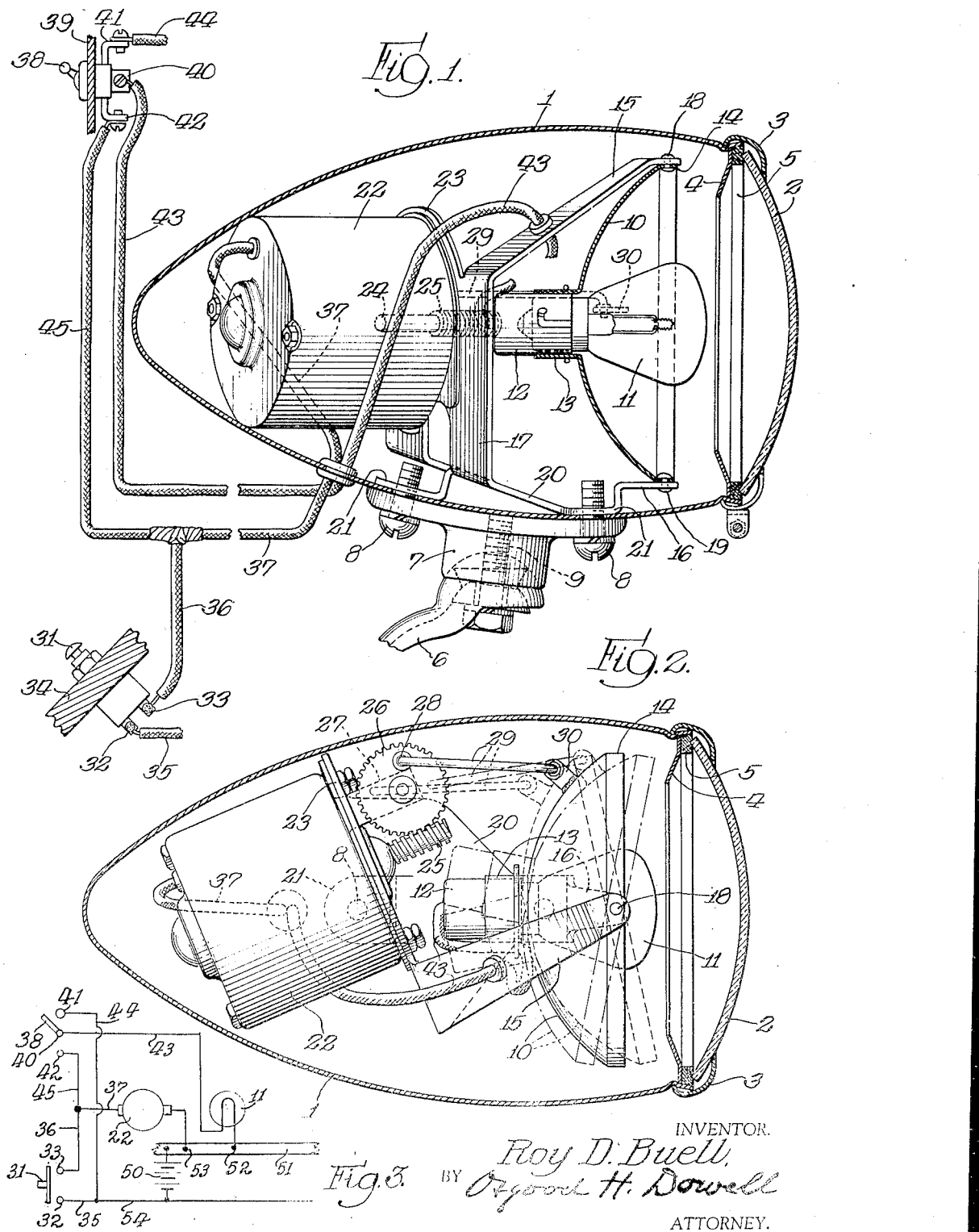
INVENTOR.
Roy D. Buell,
BY Osgood H. Dowell
ATTORNEY.

Patented Nov. 4, 1941

2,261,222

UNITED STATES PATENT OFFICE 2,261,222

ELECTRIC MOVABLE BEAM LAMP

Roy D. Buell, Chicago, Ill., assignor to Buell Manufacturing Co., Chicago, Ill., a corporation of Illinois Application January 18, 1939, Serial No. 251,519

1 Claim. (Cl. 171—97)

This invention relates to an electric lamp of a type suitable for use as a mounting on a motor vehicle and adapted to project therefrom a light beam movable relative to the direction of travel of the vehicle.

More specifically the invention has reference to the type of electric lamp in which the light bulb and an associated reflector therefor are enclosed by a housing in which the reflector is mounted for oscillation on a vertically disposed axis and operated by a motor or electrically operable means for swinging the projected beam horizontally.

One of the objects of the invention is to provide a lamp of the type referred to practicable for use on a motor vehicle and adapted for functioning either as an adjustable beam driving lamp or as a signal lamp for signalling by waving or swinging the projected light beam; and a further object is to provide in connection therewith practicable means whereby the lamp, though mounted on the front or top of the vehicle or otherwise remotely from the driver's seat, can be conveniently controlled by the driver for operation either as a driving light or as a signal light, or for ordinary use to provide a driving light and occasional use for signalling.

The invention will be described with reference to an illustrative embodiment thereof shown in the accompanying drawing, and will be more particularly pointed out and defined in the claim appended hereto.

In said drawing:

Fig. 1 is a partial sectional view of a lamp embodying the invention, the section being taken longitudinally of the lamp housing on a central vertical plane, some of the contained working parts appearing in side elevation, and associated control means being represented diagrammatically.

Fig. 2 is a horizontal section through the longitudinal center of the lamp housing, showing a top elevation or plan view of the enclosed working parts.

Fig. 3 is a diagram of the electric circuits for the electric movable beam lamp and the motor for operating it.

It will be understood that the following description with reference to the embodiment of the invention herein selected for illustration is not to be taken as limiting the invention otherwise than as defined by the claim appended to the description.

In the drawing, 1 designates a lamp housing, represented as a horizontally disposed cup-shaped shell, which may be spun from sheet metal; said shell being closed by the lens or closure glass 2 affixed to the front end of the shell by the sheet-metal clamp ring 3; there being a trim ring 4 fitted in the mouth of the shell and a gasket 5 preferably of cork interposed between the trim ring and rim of the lens, providing a sealed anti-rattling closure.

A lamp supporting bracket arm is indicated at 6. Mounted thereon is an angularly adjustable member 7 to which the lamp housing is rigidly affixed by the attaching screws 8. Said member 7 having a ball-and-socket mounting on the arm 6 may be secured in fixed relation thereto by the bolt screw 9. The arm 6 may be a part of any suitable attaching bracket by means of which the lamp may be mounted on the front bumper of an automobile or on the roof or other appropriate part of a vehicle in fixed position relative thereto. Upon loosening the bolt screw 9, the position of the lamp may be appropriately adjusted by adjustment of the member 7.

Within the lamp housing and facing the lens 2 is a concave reflector 10 from which a beam is projected through the lens by reflection of light from a source provided by the electric light bulb 11 mounted in the lamp socket 12. The light bulb and socket may be of the conventional type used for motor vehicle illumination. By employing a reflector of the parabolic type and a clear glass light bulb whose luminous element is designed to concentrate luminosity about the light center of the bulb, and positioning the bulb with its center of luminosity in focal relation to the reflector, much light will be reflected longitudinally of the axis of the reflector or approximately parallel therewith or only slightly diverging. By positioning the light bulb with its center of luminosity slightly rearward or forward of the focus of the parabolic reflector, the reflected rays may be caused to converge or diverge, as will be understood by those familiar with the illuminating art. However the present invention is not intended to be limited in such respects nor to the use of a parabolic reflector; though a parabolic reflector having its focus at the center of luminosity of the light bulb is preferred and is assumed to be represented in the illustrative construction shown in the drawing.

In the construction shown, the reflector 10 is formed with a central tubular projection 13 in which the lamp socket member 12 is fitted and rigidly secured, making an unitary structure whereby the reflector pivotally mounted in the lamp housing carries the lamp socket and light bulb in fixed relation thereto, as is desirable. The expression "combined reflector and lamp socket unit" will be used herein as designating an unitary device comprising a reflector and electric lamp socket arranged axially thereof and in fixed relation thereto for holding an electric lamp bulb in coordination with the reflector.

The combined reflector and lamp socket unit is pivotally mounted in the lamp housing for oscillation relative thereto on a vertically disposed axis through the rim or front end portion of the reflector. As represented in the drawing, the reflector is pivotally held at the top and bottom of its rim by and between a pair of fingers or extremities of arms 15 and 16 extending from a support 17 behind the reflector, said fingers or extremities of said arms being pivotally connected with the rim of the reflector by alined pivots at 18 and 19. The bowl-shaped reflector member, which may be stamped from thin sheet metal, is shown formed with a cylindrical rim flange 14 having diametrically opposite holes receiving the pivot pins at 18 and 19.

The support 17, which may be a bracket stamped from thick sheet metal, is rigidly secured within and to the lamp housing, the angularly disposed bottom plate 20 of said support being formed with the feet 21 having tapped holes engaged by the attaching screws 8, thus rigidly securing the support 17 in the housing and rigidly attaching the housing to the mounting 7 on the bracket arm, the portion of the shell through which the attaching screws pass being clamped between the said member 7 and the feet 21.

Mounted on the support 17 in the rear of the lamp housing is an electric motor 22, the motor casing being rigidly affixed to the back plate 23 of said support. On the motor shaft (indicated in dotted lines in 24 at Fig. 1) is a worm 25 engaging a worm wheel 26 carried by an arm 27 projecting from the back plate of the support 17. The worm wheel has a wrist pin connection at 28 with a connecting rod 29 pivotally connected to an ear 30 welded or rigidly fixed to the back of the reflector. By operation of the motor, the reflector together with the lamp socket and lamp carried thereby is oscillated about the aforesaid vertically disposed axis for swinging the projected light beam horizontally.

It will be observed that the entire mechanism of the lamp is compactly arranged within an entirely enclosed by the cup-shaped housing shell, into which the mechanism as a preassembled organization may be inserted through the mouth of the shell when the lens or closure glass is removed. The compactness of the organization is attributable in part to the manner of mounting the reflector for oscillation on an axis through the rim or front end portion of the reflector, allowing the motor to be mounted within the cup-shaped shell behind the reflector. The manner of mounting the reflector is especially advantageous in that its oscillation on an axis through its rim or front end portion avoids lateral swinging of the said rim or front end portion, which is the part of the reflector of greatest diameter, and therefore obviates the necessity of providing additional clearance between the reflector and interior of the housing to allow for the swinging movement. Therefore the reflector may be of a diameter as large as permitted by the mouth of the shell or opening through which it is inserted, and the interior diameter of the housing need be no greater than to provide reasonable clearance for the extremities of the arm 15 and 16 and pivotal connections 18 and 19. It will be observed in the illustrative construction that the reflector is of a diameter nearly as large as the diameter of the lens, the reflector being of greater diameter than the internal diameter of the trim ring 4 which conceals the rim portion of the reflector and mounting means therefor, presenting a neat appearance at the front of the lamp.

The operating mechanism of the illustrative construction is exceedingly simple and compact, and further compactness is obtained by mounting the motor as shown with its axis at an angle to the axis of the lamp housing, placing the worm 25 at a position where it will not interfere with the swinging movement of the lamp socket. In Fig. 2 of the drawing the medial position of the combined reflector and lamp socket unit is shown in full lines, while extreme positions of the unit and associated connections are shown in dotted lines. The cylindrical rim flange 14 of the reflector functions not only to provide a front end portion or rim which can be satisfactorily mounted between the extremities of the supporting arms 15 and 16, but also reinforces or strengthens the thin sheet metal reflector member, resisting tendency to distort it by the force applied through the connecting rod 29.

In addition to the simplicity of the operating connections between the motor and reflector, the operation of the reflector through a worm gear drive is desirable for speed reduction, or in other words the operating connections involve a slow motion mechanism. It is desirable that the reflector should be oscillated at a sufficiently moderate rate to permit control for locating the projected light beam as desired for a driving light, by stopping the motor when a desired position of the projected beam is attained. With the mechanism shown, the operation of the worm wheel is at a speed much reduced below that of the motor shaft; for example, assuming the motor to be a miniature motor of moderate speed suitable for such a lamp construction, the speed reduction through the worm and worm wheel drive may be such as to give a worm wheel speed $\frac{1}{40}$ of the motor shaft speed, in order that the reflector may be operated to swing the projected light beam at a moderate rate, say at a rate of about one complete oscillation per second, for example.

Referring to the control means for the lamp diagrammatically shown in Fig. 1, the numeral 31 designates the operating element of a normally open switch whose contacts are indicated at 32 and 33. This may be a foot switch mounted on the foot-board 34 of a motor vehicle, the operating element 31 being a knob or button to be depressed by the driver's foot for closing the switch. The switch contact 32 is connected by the wire 35 with a source of electric current, which may be any live wire or part of the motor ignition or illuminating system of the vehicle carrying the lamp. The other switch contact 33 is connected by the wire 36 to the conductor 37 leading to one terminal of the motor, whose other terminal may be grounded. The numeral 38 designates the handle of a two-way switch or single pole double throw switch mounted on the panel board 39 of the vehicle and whose contacts are indicated at 40, 41 and 42, the switch blade being always electrically connected with the medial contact 40 which is connected with the conductor 43 leading to the lamp. The lamp bulb and socket may be of the conventional so-called single terminal type, in the sense that one terminal of the lamp filament is grounded, as is customary in automobile illumination. The switch contact 41 is connected by the wire 44 with a source of current, which may be any live wire or conductor of the ignition or illuminating system. The other switch contact 42 is connected by the wire 45 with the conductor 36 leading from the foot switch. The several wires referred to are shown with insulation covers.

When the lamp switch 38 is in the position shown, it connects the contacts 40 and 41, so that current will flow to the lamp independently of the motor circuit, the motor circuit being open. The lamp may then be used as a driving light, the projected beam being in a fixed relation to the vehicle. If desired to shift the position of the projected beam to the right or left, the driver may press on the button 31, thus closing the circuit to the motor which will operate the reflector 10 to swing or oscillate the projected beam. When the beam is in the desired relation to the car, the driver may release the foot switch, thus stopping the motor. Or if the driver desires to signal by waving or swinging the projected beam for a few moments, he may hold his foot on the foot switch 31, and again he may release the foot switch to stop the operation when the projected beam is in desired relation to the car. When the lamp switch 38 is thrown to the opposite extreme position to that shown, it will connect the contacts 40 and 42, and in that case the lamp will not be lighted unless and until the driver closes the foot switch, whereupon current will flow from the foot switch to the motor through the conductor 37 and to the lamp through the conductors 45 and 43. So, when the lamp switch is in the opposite position from that shown, the lamp may be used exclusively as a signal light, which will project and oscillate the projected beam upon closure of the foot switch.

For ordinary use of the lamp as an adjustable driving light, or for alternate use as a driving light and signal light, the lamp housing will usually be mounted in relation to the vehicle at a slight inclination so that the projected beam will strike the road at an appropriate distance ahead of the vehicle, say at about seventy-five to one hundred feet ahead.

In the circuit diagram shown in Fig. 3, the numeral 50 designates the battery of the automobile ignition and lighting system, one side of the battery circuit being made through or connected with "ground" 51 constituted by a part of the automobile frame, to which are grounded or connected one terminal of the electric movable beam lamp 11, as indicated at 52, and one terminal of the motor 22 as indicated at 53. Upon closing the switch 31, the motor circuit is closed from the battery through conductors 54 and 35, switch 31, conductors 36 and 37, and through the motor 22 to the ground connection 53. When the lamp switch 38 is in position to connect the contacts 40 and 41, the circuit for the lamp 11 is closed from the battery through conductors 54 and 44, switch 38, conductor 43 and through the lamp to the ground connection 52. When the lamp switch 38 is in its opposite position for connecting the switch contacts 40 and 42, the closing of the foot switch 31 will close the circuit for the motor 22 and also a circuit for the lamp 11 from the battery through conductors 54 and 35, switch 31, conductors 36 and 45, switch 38 connecting contacts 40 and 42, and conductor 43 through the lamp 11 to the ground connection at 52.

What I claim as my invention is:

A movable beam electric lamp having, in combination, a light bulb, a pivotally mounted reflector for projecting a beam therefrom, means comprising an electric motor for oscillating said reflector for swinging the projected beam, a normally open motor switch, a double throw single pole lamp switch, a conductor leading from a contact of the motor switch to the motor, the other contact of said switch being connected to a source of current, a branch from said conductor connected with one of the three contacts of the lamp switch another of whose contacts is connected with a source of current and whose intermediate contact is connected with the bulb, whereby in one position of the lamp switch current may pass to the bulb only upon closure of the motor switch to close the circuit through the motor, and in another position of the lamp switch current may pass to the bulb independently of the motor circuit.

ROY D. BUELL.